United States Patent [19]

Okuno et al.

[11] Patent Number: 4,478,574
[45] Date of Patent: Oct. 23, 1984

[54] SCRAP PREHEATING SYSTEM FOR AN ELECTRIC FURNACE

[75] Inventors: Ryuzo Okuno, Kobe; Keio Toyoda, Akashi; Masahiro Sarai, Kobe; Kiyoshi Takai, Takagihigashi, all of Japan

[73] Assignees: Kawasaki Jukogyo Kabushiki Kaisha, Kobe; Godo Seitetsu Kabushiki Kaisha, Osaka, both of Japan

[21] Appl. No.: 410,890

[22] Filed: Aug. 24, 1982

[30] Foreign Application Priority Data

Aug. 31, 1981 [JP] Japan ................................ 56-137194
Jan. 8, 1982 [JP] Japan .................................... 57-2127

[51] Int. Cl.³ .............................................. F27D 17/00
[52] U.S. Cl. ..................................... 432/180; 373/80; 432/28; 432/72; 432/179
[58] Field of Search ...................... 432/9, 28, 72, 180, 432/179; 373/80

[56] References Cited

U.S. PATENT DOCUMENTS 3,870,474 3/1975 Houston ............................... 432/180
4,242,084 12/1980 Jamaluddin ............................ 432/28
4,280,836 7/1981 Maeda ..................................... 75/12
4,375,958 3/1983 Date et al. ............................ 373/80

Primary Examiner—John J. Camby
Attorney, Agent, or Firm—Marshall, O'Toole, Gerstein, Murray & Bicknell

[57] ABSTRACT

This disclosure relates to a system for preheating scrap before charging in an electric furnace and for preventing the release of malodorous or noxious gas. The system includes a first duct leading from the furnace exhaust gas outlet to a chimney; a branching duct is connected in the first line for passing part of the gas to the chimney and for diverting the remainder of the gas to a scrap preheater. After preheating the scrap, the diverted gas is recirculated back to the first line at a junction which is adjacent the furnace outlet. The system further includes gas combustion means connected in the first line between the junction and the branching duct, and a heat equalizer-accumulator in the first line between the combustion means and the chimney. The system may further include a heat exchanger connected in the first line downstream of the branching duct and a second line for passing the diverted gas through the heat exchanger after it leaves the scrap preheater. A temperature responsive device may be connected in the first line for adjusting the amount of the diverted gas.

5 Claims, 17 Drawing Figures

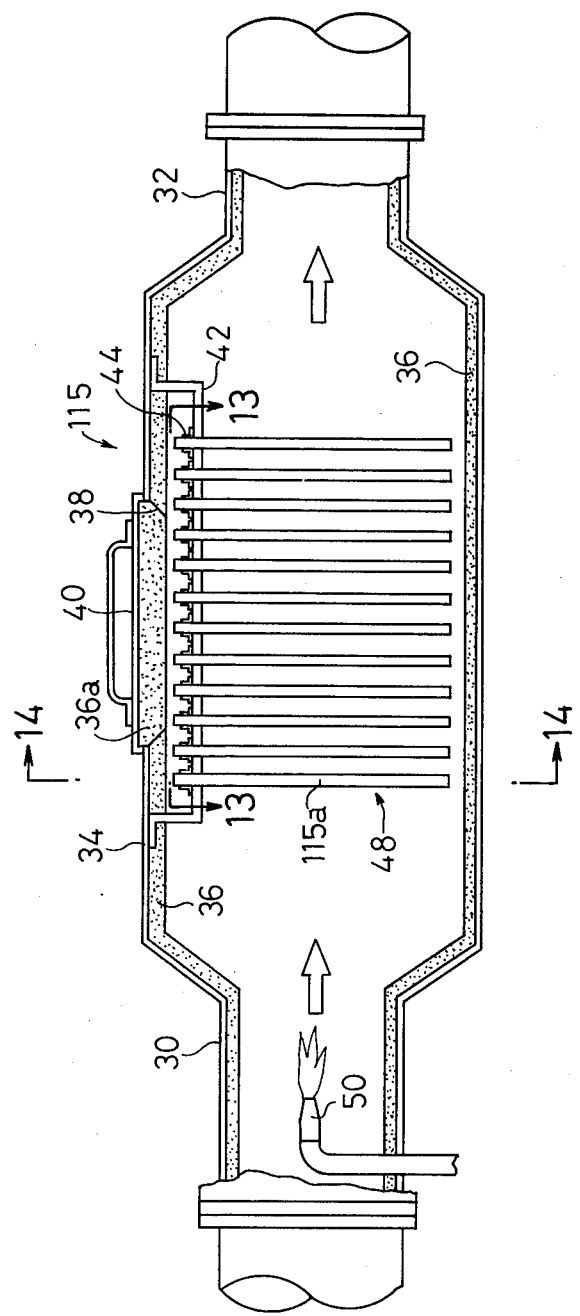

SCRAP PREHEATING SYSTEM FOR AN ELECTRIC FURNACE

This invention relates to a system for preheating scrap metal before it is processed in an electric furnace, employing the hot exhaust gas from the furnace.

Conventional scrap preheating apparatus of the present type releases objectionable exhaust gas into the air. This gas contains malodorous and noxious vapors of organic substances such as oils, paints and rubber that are mixed with the scrap. Because this gas is a source of environmental pollution, some apparatus of this character have been prohibited.

FIG. 1 shows a prior art preheating system that attempts to overcome the above pollution problem, wherein the objectionable gas from a scrap preheater 1 is fed back through a duct 2 to a high temperature duct 4 at an exhaust outlet of an electric furnace 3. Thus, the gas is reburned and thereby cleansed before being passed through a dust remover 5 and a chimney 6 and to be released into the air.

However, the temperature of the exhaust gas from the furnace 3 varies greatly as shown by the curves A in FIG. 2, as air enters the furnace each time the furnace is charged with preheated scrap. If the furnace gas is too hot, scrap in the preheater will fuse and the preheating basket(s) will be deformed; on the other hand, if the gas is too cool, the scrap will not be sufficiently heated in the preheater. If the exhaust gas immediately leaving the furnace has a temperature which is too low to burn objectionable components of the gas from the preheater, these components will not be reburned and the gas will not be cleansed, and the bad odors will be released into the air.

In addition, some dust contained in the exhaust gas from the furnace will stick to the scrap in the preheater, and some of this dust will enter the furnace together with the scrap, thereby lowering the quality of the steel. The remainder of the dust on the scrap will spread around the furnace area when the furnace is charged with the scrap, thus necessitating the use of dust collectors, etc.

It is an object of this invention to provide a scrap preheating system for use with an electric furnace, which enables the temperature of the exhaust gas from the furnace, the temperature of which gas normally varies greatly, and the cooler gas from the preheater, to be maintained at substantially constant temperature which is high enough to burn objectionable components of the gas, in order to deodorize the gas from the preheated scrap, without necessitating the use of other fuel.

It is another object of the invention to provide such a scrap preheating system, which prevents the steel quality from being lowered because of dust which has adhered to the scrap in the preheater and entered the furnace, and which prevents dust on the preheated scrap from spreading around when the furnace is charged with the scrap.

It is a still further object of the invention to provide such a scrap preheating system, which effectively recovers a quantity of the excess heat possessed by the portion of the gas mixture which is eventually released into the air.

In accordance with this invention, a system is provided for preheating scrap using the exhaust gas from an electric furnace, said system comprising a first gas line or duct for passing the hot and dust-laden exhaust gas from the furnace through a dust remover and eventually into the surrounding air, branch means provided in said first line before or upstream from said dust remover for diverting a portion of the gas entering said branch means, and a second gas line for recirculating said portion of the gas through a scrap preheater to said first line at a junction between said furnace and said branch means, said system further including combustion means connected in said first line between said branch means and said junction of said first and second lines for burning objectionable components of the gas, and a heat regenerator or equalizer-accumulator provided in said first line between said combustion means and said dust remover and either before or after said branch means.

This system may further comprise a heat exchanger connected in said first line following said branch means and said heat accumulator, and means for directing the gas from said preheater to pass through said heat exchanger before being fed back to said first line.

This system may further comprise temperature-responsive means provided in said first line between the junction where the forward end of said second line is connected to said first line and the output of said heat accumulator, and means provided in said second line and operated by said temperature responsive means to control the quantity of gas being recirculated through said second line.

This system may further comprise a preheating burner provided in said first line between the junction where the forward end of said second line is connected to said first line and said regenerator.

Preferred embodiments of this invention are described in detail below, by way of example, with reference to the accompanying drawings wherein:

FIG. 12 is a side view partially in longitudinal section showing another form of regenerator;

The equivalent parts of the various embodiments are given the same reference numerals to avoid the need for repeating the explanation.

Figure 3:
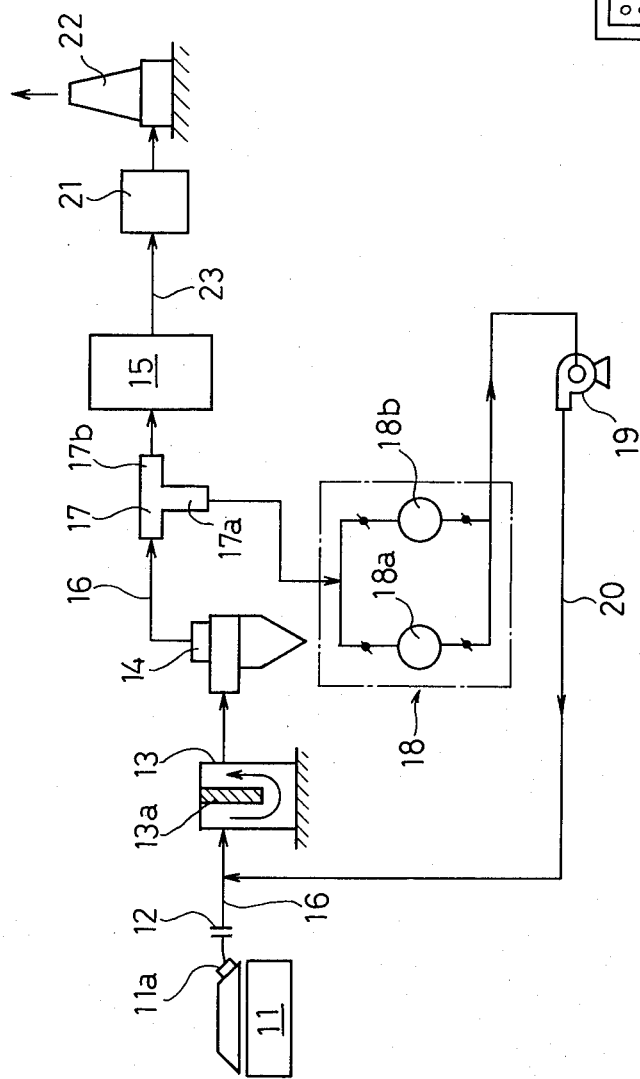
FIG. 3 is a block diagram of a system in accordance with the first embodiment of this invention.

With reference first to FIG. 3, an electric furnace 11 for refining scrap has an outlet or gas vent 11a for exhausting gas. A high temperature gas duct or line 16 extends from the outlet 11a through a gap adjusting ring 12, a combustion tower 13 and a high temperature dust remover 14, to the inlet of a branching duct 17, all of which are connected in series.

Connected to one outlet branch 17a of the branching duct 17 is a scrap preheater 18 having two or more scrap baskets 18a and 18b disposed in parallel or in series with each other. Switching valves for the gas are connected at opposite sides of each basket. A gas return line 20 extends from the outlet of the preheater 18 through a flow inducing fan 19 and back to the exhaust duct 16, between the furnace outlet 11a and tower 13, for example, between the ring 12 and the tower 13, as illustrated, or to the tower 13.

Connected to the other branch 17b of branching duct 17 is a gas line 23 which extends through a regenerator or temperature equalizer-deodorizer 15 (better shown in FIG. 4), a dust remover 21 and a chimney 22.

The ring 12 interconnects the outlet 11a and the line 16, and varies the gap between the ducts at its opposite sides to mix a desired amount of air with the exhaust gas leaving the furnace, in order to control the combustion of the components of the gas which have not been burned and the gas temperature.

The combustion tower 13 may be a dust remover of the gravity setting type, which lowers the flow rate of the gas, deflects the gas flow by a partition 13a to remove dust by its mass or gravity, and burn the substances which have not burned by the heat possessed by the gas and the lowered gas flow rate.

The hot dust remover 14, which may be omitted from the system, may be a cyclone-type for removing dust which is not removed in the combustion tower 13.

Figure 4:
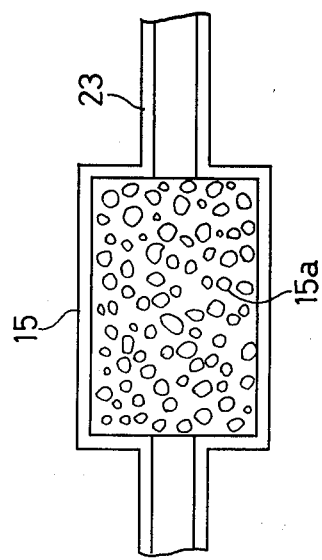
FIG. 4 is a sectional view of a regenerator of the system shown in FIG. 3.

As shown in FIG. 4, the equalizer-deodorizer 15 comprises a housing loaded with a number of heat accumulating elements 15a such as pieces of steel and bricks for heat exchange with the gas passing therebetween.

Figure 1:
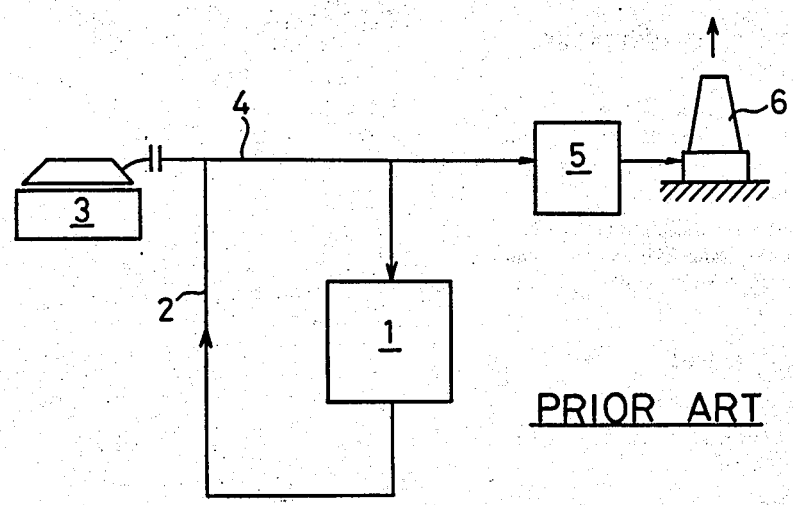
FIG. 1 is a block diagram of a prior art scrap preheating system utilizing exhaust gas from an electric furnace.
Figure 2:
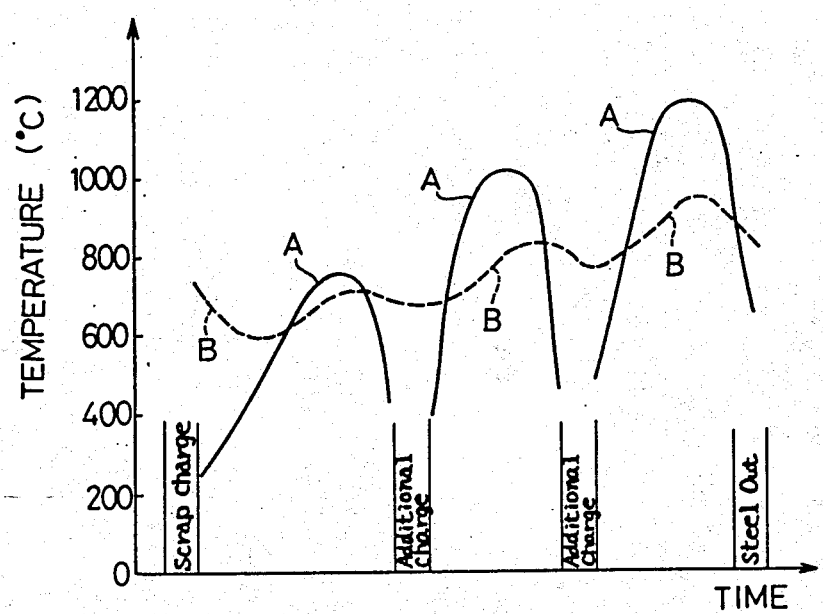
FIG. 2 is a chart illustrating variations in the temperatures of the gas exhausted from an electric furnace and the gas in a temperature equalizer employed in accordance with this invention.

The equalizer-deodorizer 15 is provided to substantially smooth out or equalize the temperature of the gas passing through it, as shown by curves B in FIG. 2, even though the temperature of the exhaust gas from the furnace 11 changes due to charging of the furnace with scrap at predetermined time intervals. The heat accumulator elements 15a absorb heat when the gas is at temperature peaks, and they release heat when the gas is at temperature valleys, thereby evening the gas temperature. This enables the temperature of the gas passing through the equalizer-deodorizer 15 to always be kept sufficiently high to burn the malodorous components. A temperature of at least 600° C. is desired in order to eliminate the malodorous components of the gas. Without the unit 15, the temperature periodically falls below the 600° C. level as shown by the valleys between the temperature peaks of Curve A. The equalizer-deodorizer 15 smoothes out the temperature variations in it above this level even though the temperature of the gas leaving the furnace varies greatly. Since the temperature in the unit is maintained above approximately 600° C., any malodorous components of the gas will be burned out in the unit 15.

In operation, the valves are opened at both ends of a basket 18a which is charged with scrap, and the valves of the other basket 18b are closed. The basket 18b may at that time either discharge preheated scrap, be charged with new scrap, or be on standby.

While the electric furnace 11 is working, the hot exhaust gas passes through the gap adjusting ring 12 to the combustion tower 13, where substances in the gas which have not been burned are burned, and the coarse dust is removed. After additional dust is removed in the hot dust remover 14, the gas enters the branching duct 17.

A portion of the gas then passes from the duct branch 17a to the preheater basket 18a in order to preheat the scrap to a desired temperature. After heat exchange with the scrap, the gas will have a temperature in the order of, for example, 100°–200° C., and consequently it will have a bad odor due to evaporation of organic substances contained in the scrap.

The malodorous gas is recirculated by the fan 19 through the duct 20 to the hot gas duct 16, and mixed with the hot exhaust gas from the furnace. The other portion of the gas passes from the duct branch 17b to the regenerator or deodorizer 15 for heat exchange with the accumulating elements 15a to raise or lower the temperature the gas.

In the equalizer-deodorizer 15, the substances which have not been burned in the superfluous portion of the gas containing the malodorous components, burn to deodorize the gas. These components are burned in the unit 15 because the temperature of the elements 15a is above the level needed to burn these components, and consequently these components are burned out as the gas flows through the unit 15. After further dust is removed in the remover 21, the deodorized gas is released from the chimney 22 into the air. Thus, the bad smell produced by preheating the scrap is removed and is not released into the air.

Also, the dust which would otherwise stick to the scrap is removed in the combustion tower 13 and in the hot dust remover 14 in order to reduce the amount of dust entering the scrap preheater 18. This prevents dust from spreading around when the furnace 11 is charged with preheated scrap, and it also improves the steel quality.

Figure 5:
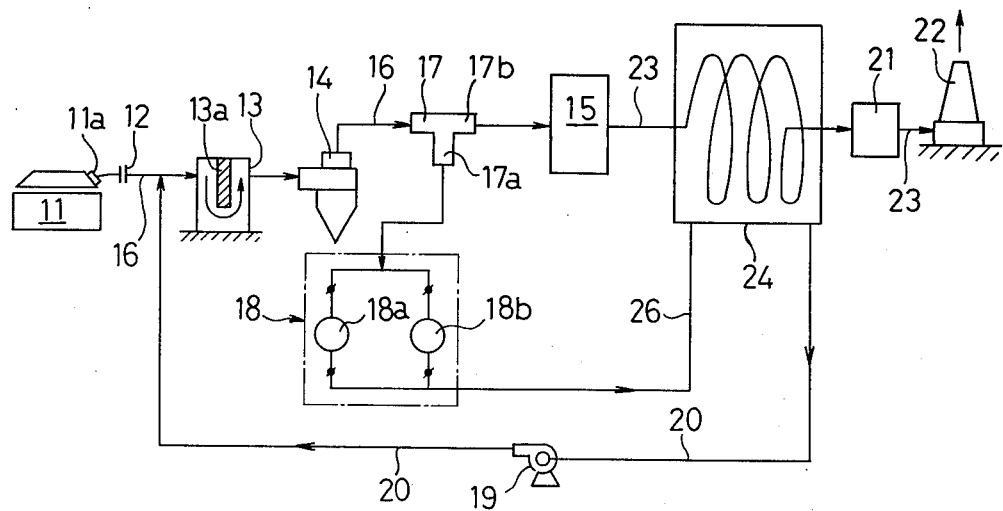
FIGS. 5–8 are block diagrams similar to FIG. 3 but showing the second to fifth embodiments, respectively.

FIG. 5 shows the second embodiment, which can effectively utilize a greater amount of heat possessed by the hot exhaust gas from the electric furnace. In the line 23 between the equalizer-deodorizer 15 and the dust remover 21 is provided a heat exchanger 24, which is passed by both the gas from the equalizer-deodorizer 15 and the malodorous gas from the preheater 18 through a line 26, the gases exchanging heat with each other.

As a result, the temperature of the malodorous gas leaving the scrap is raised by a superfluous amount of heat of the gas from the equalizer-deodorizer 15, which amount would otherwise be released into the air. The heated malodorous gas is recirculated through the line 20 to the hot gas line 16. This promotes the combustion in the tower 13 of the substances which have not burned, and increases the amount of heat which is accumulated by the equalizer-deodorizer 15.

The heat exchanger 24 should preferably be of the indirect or multitubular type, but may otherwise be of direct type having heat accumulating elements, such as does the equalizer-deodorizer 15.

Figure 6:
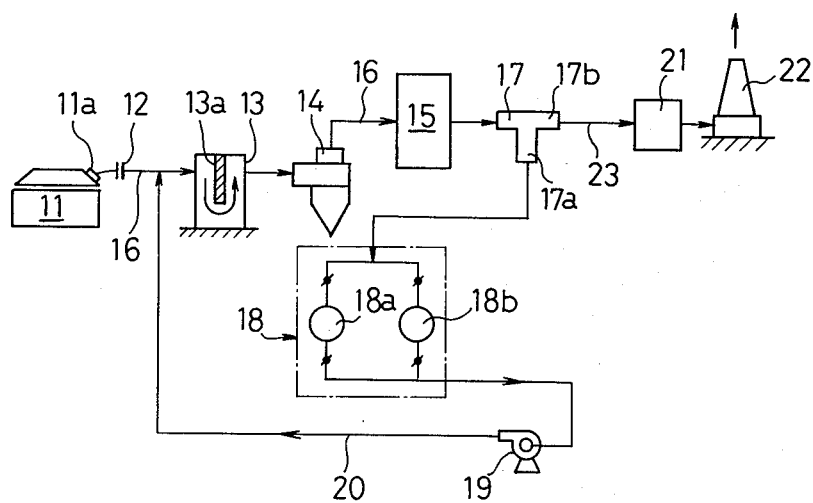

FIG. 6 shows the third embodiment having the arrangement of FIG. 3, but with the equalizer-deodorizer 15 located in the line 16 between the hot dust remover 14 and the branching duct 17, rather than after tne duct 17 as shown in FIG. 3.

Even if the exhaust gas from the electric furnace 11 is too hot, this arrangement enables the gas to be cooled to a temperature suitable to preheat scrap so as to prevent the scrap from fusing. If the gas is too cool, suitably heated gas can be supplied to the scrap preheater 18.

Figure 7:
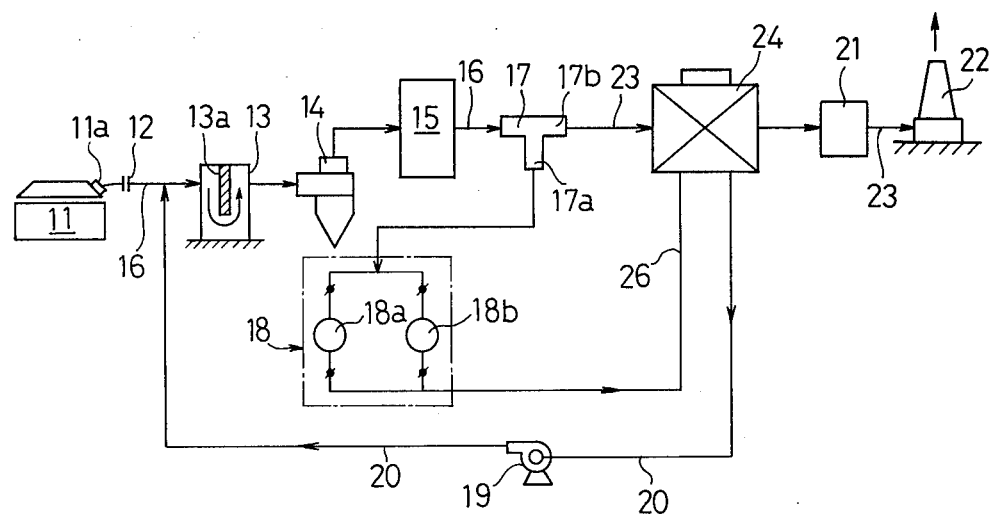

FIG. 7 shows the fourth embodiment having, in addition to the components shown in FIG. 6, a heat exchanger 24 provided in the line 23 between the duct branch 17b and the dust remover 21, similar to the arrangement of the exchanger 24 shown in FIG. 5. The malodorous gas passes from the scrap preheater 18 to the heat exchanger 24 to raise its temperature before returning to the connection between the furnace 11 and the combustion tower 13.

Figure 8:
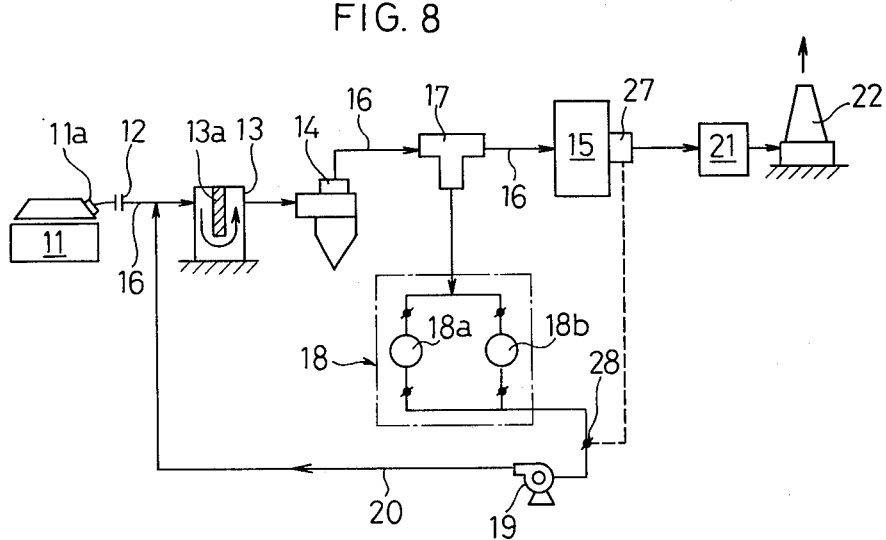

FIG. 8 shows the fifth embodiment having, in addition to the arrangement of FIG. 3, a temperature detector 27 provided, for example, at the outlet of the equalizer-deodorizer 15, and a valve or damper 28 provided in the return line 20, for example, between the outlet of the scrap preheater 18 and the fan 19. The damper 28 is controlled by the detector 27 to control the rate of the gas being recirculated.

The control varies the rate of the gas flow through the preheater 18 in response to the temperature variation of the gas at the outlet of the equalizer-deodorizer 15 across of predetermined value, at or above which the malodorous components of the gas are burned. When the exhaust gas from the furnace 11 is too hot, the quantity of the recirculated gas is increased to cool the hot gas, thereby preventing the scrap in the preheater 18 from fusing and the baskets from deforming. When the exhaust gas is too cool, the quantity of the recirculated gas is reduced to keep the gas temperature at the deodorizer 15 high enough to burn the malodorous components.

Instead of the damper 28, means may instead be provided for changing the speed of the fan 19 to control the rate of gas flow through the return line 20. Such a temperature detector 27 may otherwise be provided at a location in the hot gas duct 16 between its junction with the forward end of the return duct 20 and the outlet of equalizer-deodorizer 15, to detect the temperature of the gas or the heat accumulating elements 15a.

The temperature range within which the gas can be deodorized in the equalizer-deodorizer 15 depends on its malodorous components. Experiments have proved that a temperture of at least 600° C. is necessary to deodorize the gas from scrap of the sort processed by an electric furnace, and that a higher temperature speeds up the deodorization.

Figure 9:
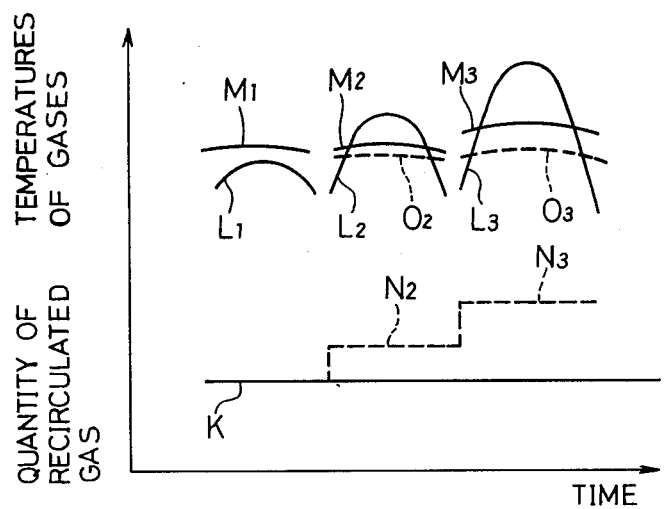
FIG. 9 is a chart showing the relationship between the temperatures of the gas and the quantity of recirculated gas.

Consequently, the control 27 should be preset so that, when the temperature of gas at the outlet of deodorizer 15 exceeds, for example, 650° C., the damper 28 is opened wider to increase the quantity of hot gas flowing into the preheater 18, giving the scrap more heat. The increased quantity of gas cooled in the preheater 18 returns to the duct 16 to be mixed with the hot furnace gas and then enters the deodorizer 15. When the temperature at the equalizer-deodorizer outlet drops below 650° C., the damper is closed somewhat. This increased damping continues until the temperature is approximately restored to the predetermined value, as graphically shown in FIG. 9.

If the rate of gas flow through the preheater 18 were constant as shown by the line K, the temperature of the exhaust gas from the furnace 11 would change and become high as shown by the curves L1, L2, L3, raising the temperature of equalizer-deodorizer 15 as shown by the curves M1, M2, M3. Now, if the flow rate in the return duct 20 were raised as shown by lines N2 and N3, the temperature of the gas at the deodorizer outlet would lower as shown by the lines 02 and 03.

Thus, the temperature variation of the mixed gas is reduced in amplitude to thereby preheat the scrap always at a suitable temperature, and to maintain the burning of the malodorous components of gas from the preheated scrap.

Figure 10:
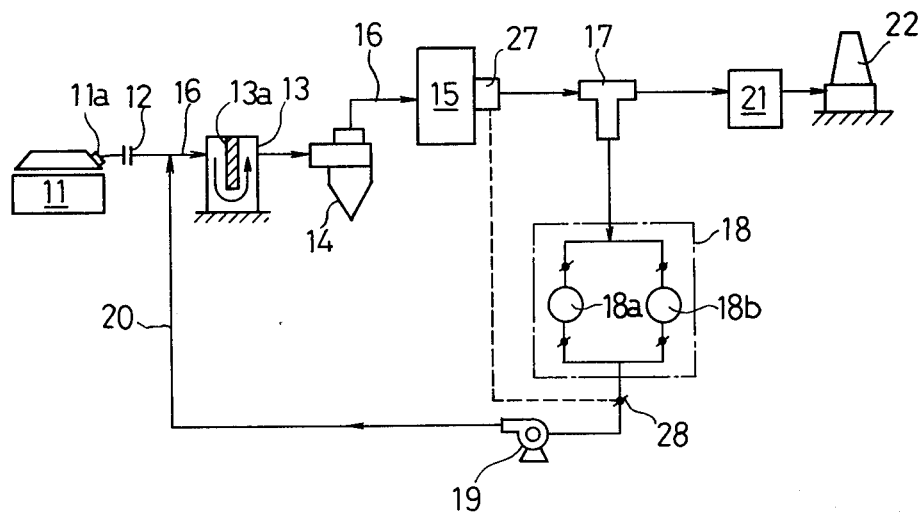
FIGS. 10 and 11 are block diagrams similar to FIG. 3 but showing the sixth and seventh embodiments, respectively.

FIG. 10 shows the sixth embodiment which is similar to the arrangement of FIG. 8, but wherein the branching duct 17 is located between the equalizer-deodorizer 15 and the dust remover 21, similar to the FIG. 6 embodiment. This allows the temperature of the gas to be adjusted substantially to a predetermined value in the equalizer-deodorizer 15 before it is supplied to the scrap preheater 18, thereby improving the heat recovery by the scrap.

Figure 11:
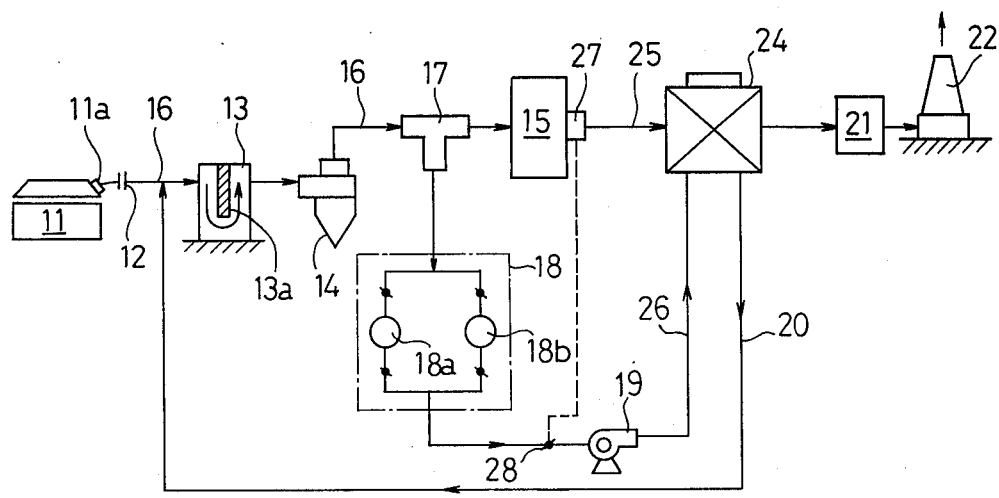

FIG. 11 shows the seventh embodiment having, in addition to the components of FIG. 5, a temperature detector 27 provided in the outlet of the equalizer-deodorizer 15, and a damper 28 provided in the line 26 between the scrap preheater 18 and the heat exchanger 24. The damper 28 is controlled by the detector 27 to control the rate of the gas recirculation through the preheater 18 and the heat exchanger 24 to the hot gas duct 16.

FIG. 12 shows a specific form of regenerator 115 adapted for use as the heat equalizer-deodorizer 15 such as the unit shown in FIG. 3. The regenerator 115 has a gas inlet 30 connected to the duct leading from the duct branch 17b, and an outlet 32 connected to the duct leading to the dust remover 21. The regenerator 115 has a shell 34 lined with refractory matter 36, to function also as a regenerative furnace.

The body of the regenerator 115 is formed with an upper opening 38 that extends through the shell 34 and the liner 36, which is normally closed in gas-tight fashion by a lid 40 that is also lined with refractory matter 36a. Fixed to the inside of the regenerator body are a pair of laterally spaced supports 42 (see also FIGS. 13 and 14), which extend longitudinally of the regenerator 115, parallel to each other and just below the opening 38.

Figure 13:
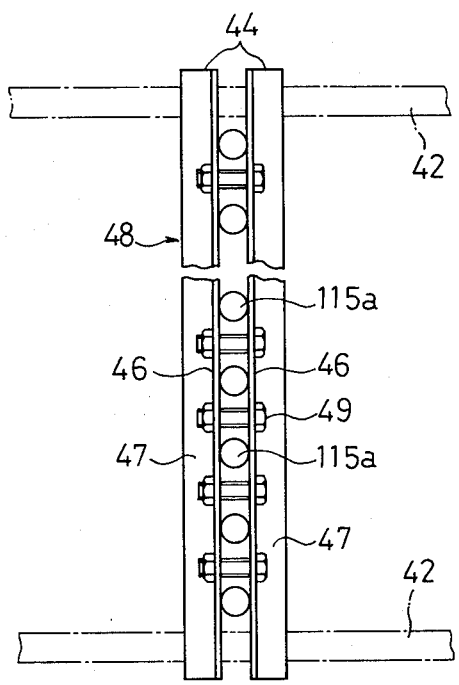
FIG. 13 is an enlarged fragmentary view of the regenerator, taken on the line 13—13 in FIG. 12.
Figure 14:
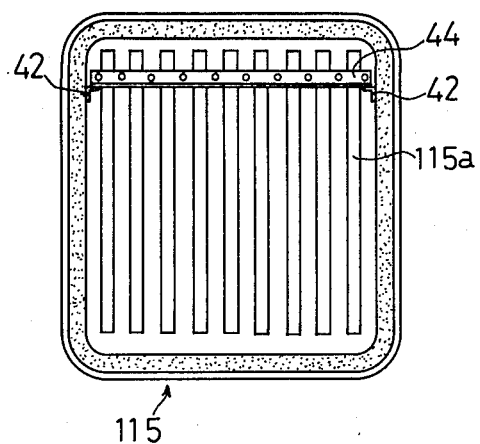
FIG. 14 is a sectional view on the line 14—14 in FIG. 12.

As shown in FIGS. 13, 14, the supports 42 support both ends of pairs of removable spaced steel angles 44, which extend perpendicularly to the supports 42. Their vertical sides 46 face each other and their horizontal bottom sides 47 rest on the supports 42.

Each pair of angles 44 supports between the vertical sides 46 the upper ends of a number of vertical steel bars 115a that form heat-accumulating elements, the bars 115a extending vertically at spaced intervals. The bars 115a and the angles 44 thereby form a separate unit 48. Thus, a bundle of elements 115a extend in spaced parallel relation to each other, both transversely and longitudinally of regenerator shell 34. The elements 115a may be secured to the angles 44 by bolts and nuts 49 (FIG. 13) on the vertical sides 46, or welded to the sides 46.

Each unit 48 comprising the angle members 44 and the elements 115a can be removed from the interior of the regenerator 115 through opening 38 when the lid 40 is removed, for replacement.

Figure 15:
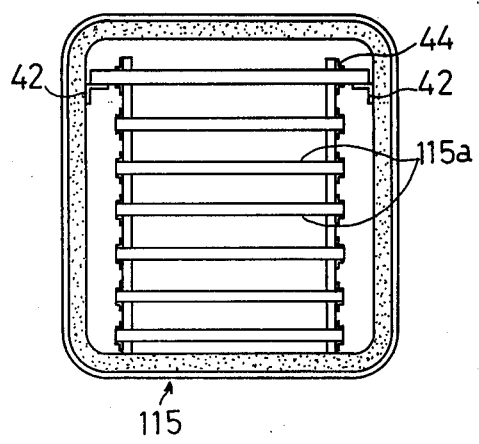
FIG. 15 is a sectional view similar to FIG. 14, but showing a modified construction.

Alternatively, as shown in FIG. 15, the elements 115a may be arranged to extend horizontally in a ladder configuration. The horizontal elements 115a are supported at their ends by vertical supports, and the upper ends of the supports are secured to the angles 44. It is possible to combine the two types of heat accumulating units shown in FIGS. 14 and 15, e.g., by alternately placing one type upstream of the other with respect to the gas flow.

The heat-accumulating elements 115a may otherwise take the form of long, deformed or flat bar steel, shaped steel or other rolled steel, or pipe steel, which can effectively absorb a high amount of heat energy from the exhaust gas and later release it.

Round bars 115a having a smooth surface pervent dust from adhering thereto, and are preferable when the exhaust gas contains a large amount of dust. Round bars having a rough surface, deformed bars and shape steel are effective in heat transfer, and are suitable when the gas contains a smaller amount of dust.

The elements 115a in the form of bar steel can be washed in water to remove the dust adhering thereto, and may be reused as scrap steel with which to charge the electric furnace 11, without the need to set them aside or discard them even when they can no longer be used as heat accumulators.

As shown in FIG. 12, the regenerator inlet 30 may be provided with a burner 50 therewithin, the nozzle of which is directed in the direction of gas flow, to preheat the regenerator 115 and the gas upstream of the steel elements 115a to a temperature that is high enough to burn the malodorous components when the regenerator 115 is not yet hot enough to operate as a deodorizer, e.g., just after the furnace 11 is started.

Figure 16:
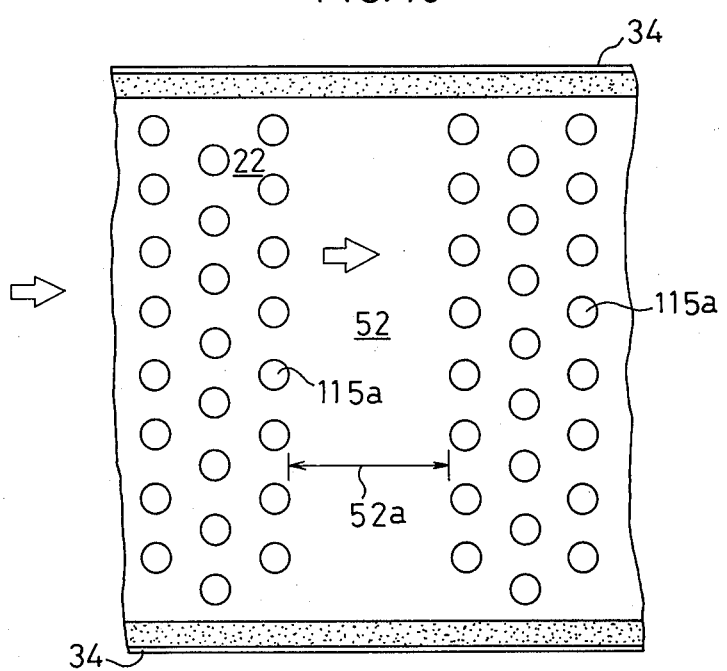
FIG. 16 is an enlarged fragmentary view in longitudinal section showing an arrangement of a plurality of heat-accumulating units of the regenerator.

As shown in FIG. 16, the steel elements 115a may be divided into two or more bundles to form a space 52 therebetween, which is a gas path greater in cross-section than between the elements in the bundles. The gas flow speed is lower in the space 52. By varying the width 52a of the space 52, the time for the gas to pass through the regenerator 115 may be changed in order to adjust the degree of deodorization.

Figure 17:
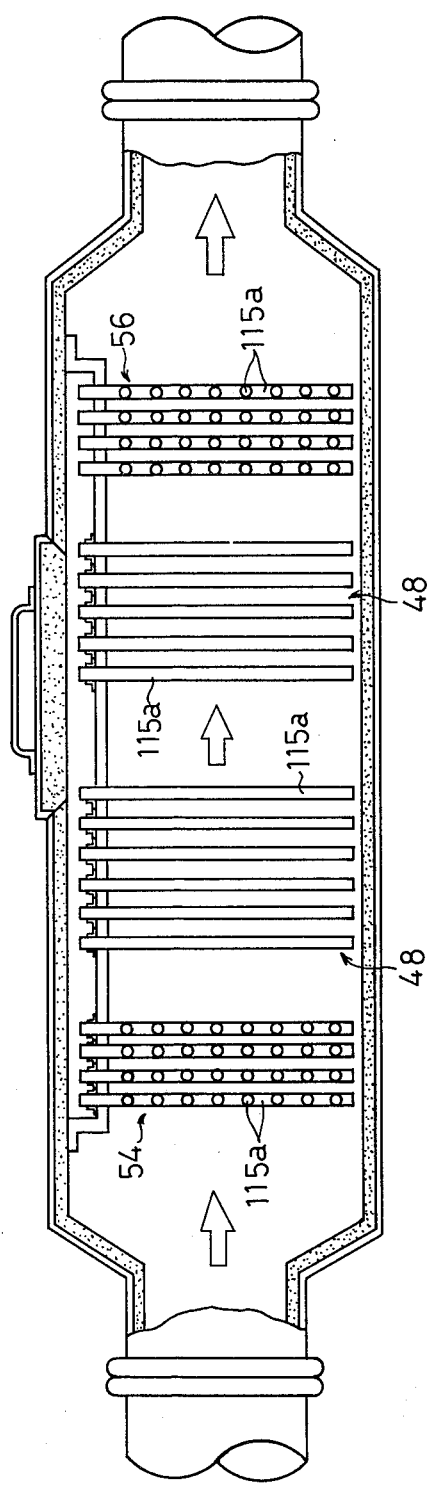
FIG. 17 is a view similar to FIG. 12, but showing a further alternative form of regenerator.

FIG. 17 shows a modification of the regenerator, which includes additional heat-accumulating units 54 provided at least upstream of the units 48, and may include further units 56 downstream of the units 48. Each additional unit 54, 56 includes steel bars 115a in crossed or latticed form and defining a number of small gas paths. Alternatively the elements may be formed of refractory bricks. These units 54 and 56 not only serve as heat accumulators, but rectify the gas flow so that it is distributed over the whole area of the units 48, thereby improving the heat exchange efficiency.

The regenerator 115 may be provided with a cleaning hopper (not shown) at the bottom of the shell 34 below the heat accumulators 115a, or in its bottom of inlet 30, to permit removal of the accumulated dust.

The upper opening 38 may instead be formed in the side wall of shell 34 of the regenerator 115, and the units 48, 54, 56 may be adapted to laterally slide on the supports and be inserted or removed through the opening.

What is claimed is:

1. Apparatus for use in a system for preheating scrap utilizing exhaust gas from an electric furnace, the system including a first gas line connected to the furnace for passing relatively hot and dusty exhaust gas from the furnace to a chimney and then into the air, branch means connected in said first line for diverting a portion of the gas entering said branch means, a scrap preheater, and a second gas line connected to the branch means, to the first line and to the preheater for recirculating said portion of gas through the scrap preheater and to said first line at a junction between said furnace and said branch means, said apparatus comprising combustion means connected in said first line between said junction and said branch means for burning malodorous components of the gas, a regenerator connected in said first line between said combustion means and the chimney, a heat exchanger connected in said first line downstream from said branch means and said regenerator, and means in said second line for directing the gas from said preheater through said heat exchanger and then to said junction.

2. Apparatus for use in a system for preheating scrap utilizing exhaust gas from an electric furnace, the system including a first gas line connected to the furnace for passing relatively hot and dusty exhaust gas from the furnace to a chimney and then into the air, branch means connected in said first line for diverting a portion of the gas entering said branch means, a scrap preheater, and a second gas line connected to the branch means, to the first line and to the preheater for recirculating said portion of gas through the scrap preheater and to said first line at a junction between said furnace and said branch means, said apparatus comprising combustion means connected in said first line betweeen said junction and said branch means for burning malodorous components of the gas, a regenerator connected in said first line betweeen said combustion means and the chimney, temperature-responsive means connected to said first line downstream of said regenerator, and means provided in said second line and operated by said temperature-responsive means to control the quantity of gas recirculated through said second line.

3. Apparatus for use in a system for preheating scrap utilizing exhaust gas from an electric furnace, the system including a first gas line connected to the furnace for passing relatively hot and dusty exhaust gas from the furnace to a chimney and then into the air, branch means connected in said first line for diverting a portion of the gas entering said branch means, a scrap preheater, and a second gas line connected to the branch means, to the first line and to the preheater for recirculating said portion of gas through the scrap preheater and to said first line at a junction between said furnace and said branch means, said apparatus comprising combustion means connected in said first line between said junction and said branch means for burning malodorous components of the gas, a regenerator connected in said first line between said combustion and the chimney, and a preheating burner provided in said first line between the junction where the forward end of said second line is connected to said first line and said regenerator.

4. Apparatus for use in a system for preheating scrap utilizing exhaust gas from an electric furnace, the system including a first gas line connected to the furnace for passing relatively hot and dusty exhaust gas from the furnace to a chimney and then into the air, branch means connected in said first line for diverting a portion of the gas entering said branch means, a scrap preheater, and a second gas line connected to the branch means, to the first line and to the preheater for recirculating said portion of gas through the scrap preheater and to said first line at a junction between said furnace and said branch means, said apparatus comprising combustion means connected in said first line betweeen said junction and said branch means for burning malodorous components of the gas, a regenerator connected in said first line between said conbustion means and the chimney, a heat exchanger connected in said first line downstream from said branch means and regenerator, means in said second line for directing the gas from said preheater through said heat exchanger and then to said junction, temperature-responsive means connected to said first line downstream of said regenerator, and means provided in said second line and operated by said temperature-responsive means to control the quantity of gas recirculated through said second line.

5. Apparatus for use in a system for preheating scrap utilizing exhaust gas from an electric furnace, the system including a first gas line connected to the furnace for passing relatively hot and dusty exhaust gas from the furnace to a chimney and then into the air, branch means connected in said first line for diverting a portion of the gas entering said branch means, a scrap preheater, and a second gas line connected to the branch means, to the first line and to the preheater for recirculating said portion of gas through the scrap preheater and to said first line at a junction between said furnace and said branch means, said apparatus comprising combustion means connected in said first line between said junction and said branch means for burning malodorous components of the gas, a regenerator connected in said first line between said combustion means and the chimney, a heat exchanger connected in said first line downstream from said branch means and regenerator, means in said second line for directing the gas from said preheater through said heat exchanger and then to said junction, and a preheating burner provided in said first line between the junction where the forward end of said second line is connected to said first line and said regenerator.

* * * * *